US008615098B2

(12) United States Patent
Yang et al.

(10) Patent No.: US 8,615,098 B2
(45) Date of Patent: Dec. 24, 2013

(54) LOUDSPEAKER BOX AND MOBILE TERMINAL DEVICE

(71) Applicant: Huawei Device Co.,Ltd., Shenzhen (CN)

(72) Inventors: Yanxi Yang, Shenzhen (CN); Yaming Jiang, Wuhan (CN); Maohuai Tan, Shenzhen (CN); Yuancai Chen, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/623,725

(22) Filed: Sep. 20, 2012

(65) Prior Publication Data
US 2013/0223668 A1 Aug. 29, 2013

(30) Foreign Application Priority Data
Feb. 27, 2012 (CN) .................... 2012 2 0065387 U

(51) Int. Cl.
*H04R 1/02* (2006.01)
(52) U.S. Cl.
USPC ............ 381/386; 381/324; 381/333; 381/334
(58) Field of Classification Search
USPC .................................. 381/386, 324, 333, 334
See application file for complete search history.

(56) References Cited

U.S. PATENT DOCUMENTS

| | | | | |
|---|---|---|---|---|
| 2004/0081329 A1* | 4/2004 | Huang et al. | .................. | 381/334 |
| 2006/0140438 A1* | 6/2006 | Kimura et al. | ................ | 381/431 |
| 2008/0025542 A1* | 1/2008 | Lee et al. | ....................... | 381/334 |
| 2009/0296970 A1* | 12/2009 | Chiu | ............................. | 381/332 |
| 2010/0032232 A1* | 2/2010 | Lim | ............................. | 181/141 |

FOREIGN PATENT DOCUMENTS

| | | |
|---|---|---|
| CN | 2681506 Y | 2/2005 |
| CN | 2702565 Y | 5/2005 |
| CN | 202424975 U | 9/2012 |

OTHER PUBLICATIONS

Extended European Search Report issued in corresponding European Patent Application No. 12182182.1, mailed Mar. 11, 2013.
International Search Report issued in corresponding PCT Patent Application No. PCT/CN2013/071612, mailed May 23, 2013, 11 pages.

\* cited by examiner

*Primary Examiner* — Davetta W Goins
*Assistant Examiner* — Amir Etesam
(74) *Attorney, Agent, or Firm* — Brinks Gilson & Lione

(57) ABSTRACT

The present disclosure discloses a loudspeaker box, including a foam, a loudspeaker and a box having an opening of the box. The loudspeaker is internally placed inside the box through the opening of the box, an outer surface of the loudspeaker is aligned to an edge of the opening of the box, a gap is set between the loudspeaker and the opening of the box, and a bottom portion of the loudspeaker abuts against the bottom portion of the box; and the foam is annularly covered on the gap between the loudspeaker and the opening of the box, such that the integral thickness of the loudspeaker box is reduced.

18 Claims, 4 Drawing Sheets

LOUDSPEAKER BOX AND MOBILE TERMINAL DEVICE

CROSS-REFERENCE TO RELATED APPLICATION

This application claims priority to Chinese Patent Application No. 201220065387.5, filed on Feb. 27, 2012, which is hereby incorporated by reference in its entirety.

FIELD

The present disclosure relates to the field of electronic product structure, in particular, to a loudspeaker box and a mobile terminal device.

BACKGROUND

As mobile terminal devices, for example, a tablet computer, become increasingly popular with users, the users pay more and more attention to the characters of thinness and thickness of a complete appliance of a mobile terminal device.

For the thickness of the complete appliance of the mobile terminal device in the prior art, the volume and the thickness of a loudspeaker box may greatly affect the thickness design of the complete appliance of the mobile terminal device. However, in the prior art, a loudspeaker is generally placed in a sealed box to form a sealed loudspeaker box, and as shown in FIG. 1, the loudspeaker 1 is placed in the box 2, where the box 2 includes a front housing and a rear housing, a foam 3 is placed between the loudspeaker 1 and an inner surface of the front housing of the box 2, and a gap is reserved between the loudspeaker 1 and the rear housing of the box 2 to finally form a sealed loudspeaker box.

However, the inventor found that, in the prior art, the thickness of the loudspeaker box in the prior art is formed of the wall thickness of the front housing and the wall thickness of the rear housing of the box, the thickness of the foam and the thickness of the loudspeaker; and because the thickness of the loudspeaker box may be affected by the four thicknesses and the placing position of the front housing, the rear housing of the box, the foam and the loudspeaker, in which the four thicknesses refer to the wall thickness of the front housing and the wall thickness of the rear housing of the box, the thickness of the foam and the thickness of the loudspeaker, the loudspeaker box may be very thick, and the complete appliance of the mobile terminal device may be very thick if the loudspeaker box is placed in the mobile terminal device.

SUMMARY OF THE DISCLOSURE

Following are a few embodiments of the present disclosure.

A loudspeaker box, including: a foam, a loudspeaker and a box having an opening of the box. The opening of the box is set in the box, the loudspeaker is internally placed inside the box through the opening of the box, an outer surface of the loudspeaker is aligned to an edge of the opening of the box, a gap is set between the loudspeaker and the opening of the box, and a bottom portion of the loudspeaker abuts against the bottom portion of the box. The foam is annularly covered on the gap between the loudspeaker and the opening of the box.

A mobile terminal device includes a loudspeaker box and a PCB circuit board, where the loudspeaker box is set on the PCB circuit board, wherein the loudspeaker box, including: a foam, a loudspeaker and a box having an opening of the box. The opening of the box is set in the box, the loudspeaker is internally placed inside the box through the opening of the box, an outer surface of the loudspeaker is aligned to an edge of the opening of the box, a gap is set between the loudspeaker and the opening of the box, and a bottom portion of the loudspeaker abuts against the bottom portion of the box. The foam is annularly covered on the gap between the loudspeaker and the opening of the box.

BRIEF DESCRIPTION OF THE DRAWINGS

To make the solutions of the embodiments of the present disclosure or the prior art clearer, the accompanying drawings used in the description of the embodiments are briefly described below. Evidently, the accompanying drawings in the description below are some exemplary embodiments of the present disclosure and persons skilled in the art may obtain other drawings based on these drawings without creative efforts.

REFERENCE NUMERALS

| 1-foam; | 2-loudspeaker; | 3-front housing; |
|---|---|---|
| 4-rear housing; | 5-metallic plate; | 6-circuit board; |
| 7-gel; | 8-box; | 21-positive endpoint; |
| 41-slot; | 61-positive endpoint; | 62-negative endpoint; |
| 63-internal section circuit board; | 64-external section circuit board; | 65-middle section circuit board; |
| 71-first gel; | 72-second gel. | |

DETAILED DESCRIPTION OF THE EMBODIMENTS

The solutions of the present disclosure are to be clearly and described in the following with reference to the accompanying drawings. It is obvious that the embodiments to be described are a part rather than all of the embodiments of the present disclosure. All other embodiments obtained by persons skilled in the art based on the embodiments of the present disclosure without creative efforts shall fall within the protection scope of the present disclosure.

In this embodiment, in order to make a complete appliance of a mobile terminal device very thin, a loudspeaker box needs to be made very thin, and the detail description is as follows.

Figure 1:
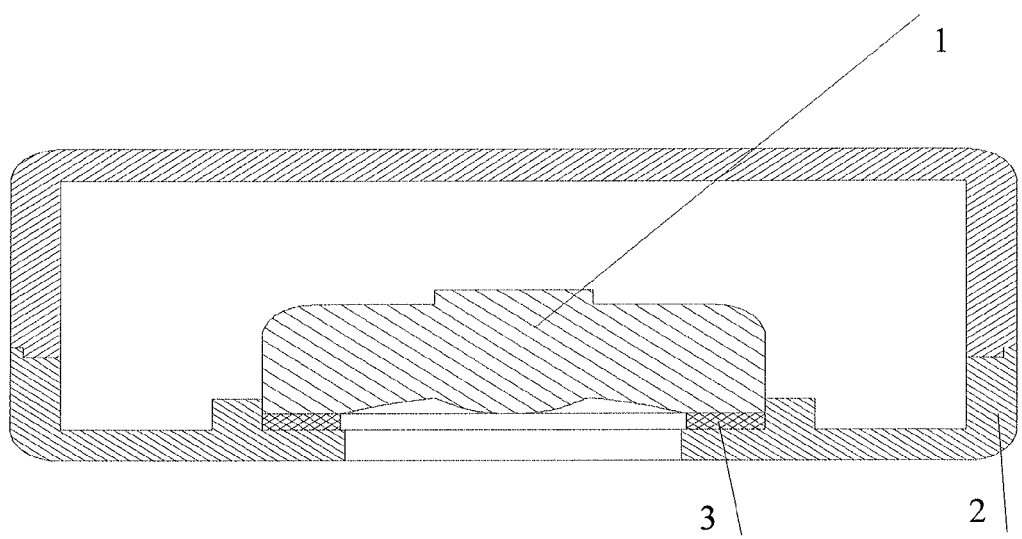
FIG. 1 shows a structural diagram of a loudspeaker box in the prior art.
Figure 2:
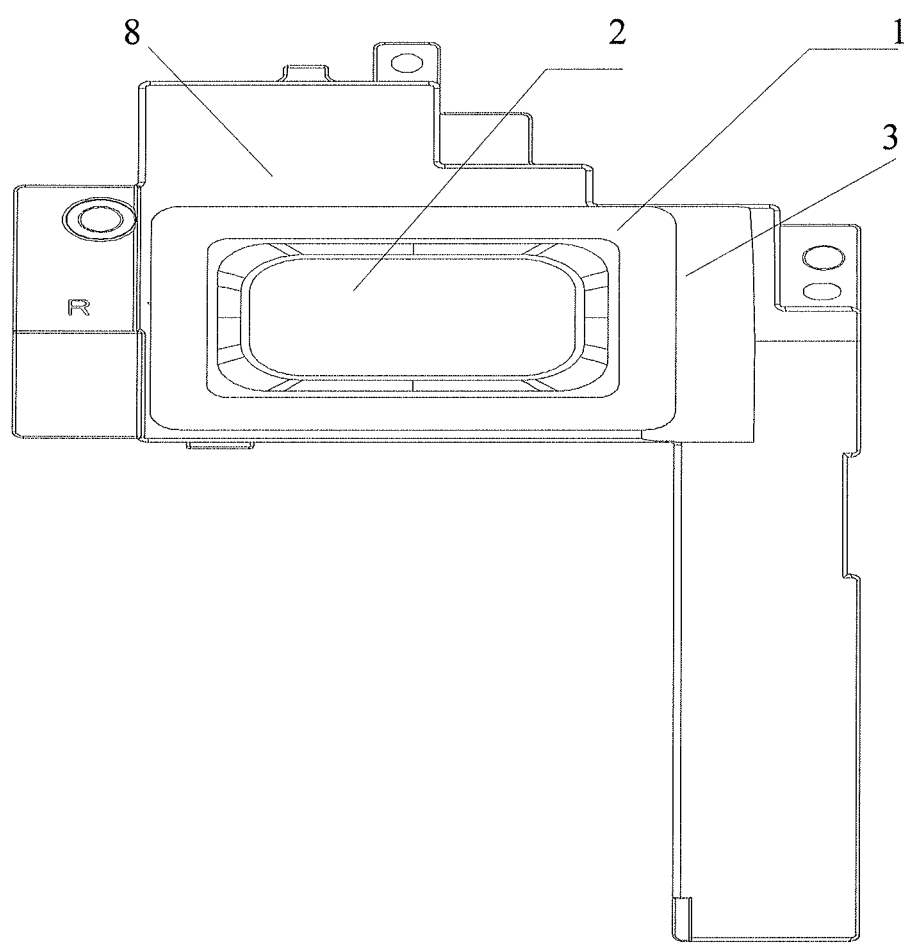
FIG. 2 shows a front structural diagram of a loudspeaker box provided by an embodiment of the present disclosure.

FIG. 2 shows a front structural diagram of a loudspeaker box provided by the present disclosure. In this embodiment, the loudspeaker box includes a foam 1, a loudspeaker 2 and a box 8. An opening is set in the box 8, the loudspeaker 2 is internally placed inside the box 8 through the opening of the box 8, an opening of the loudspeaker 2 faces outwards, the opening surface of the loudspeaker 2 is aligned to an edge of the opening of the box 8, a gap is set between the opening of the loudspeaker 2 and the opening of the box 8, and a bottom portion of the loudspeaker 2 abuts against the bottom portion of the box 8. During an actual assembling process, the opening surface of the loudspeaker 2 may be allowed to be lower or higher than the edge of the opening of the box 8. The foam 1 is configured to be covered on the gap between the opening of the loudspeaker 2 and the opening of the box 8, so that the loudspeaker 2 and the box 8 are sealed. In this embodiment, the foam is an annular foam. In this embodiment, the foam 1 is annularly covered on the gap between the opening of the loudspeaker 2 and the opening of the box 8.

In this embodiment, the box 8 includes a front housing 3, an opening is set in the front housing 3, the opening surface of the loudspeaker 2 is aligned to the edge of the opening of the front housing 3, and a gap is set between the opening of the loudspeaker 2 and the opening of the front housing 3. During the actual assembling process, the opening surface of the loudspeaker 2 may be allowed to be lower or higher than the edge of the opening of the front housing 3. The foam 1 is configured to be covered on the gap between the opening of the loudspeaker 2 and the opening of the front housing 3, so that the loudspeaker 2 and the box 8 are sealed.

In this embodiment, the foam 1 annularly adheres to the gap between the opening of the loudspeaker 2 and the opening of the front housing 3, so that the loudspeaker 2 and the box 8 are sealed.

Figure 3:
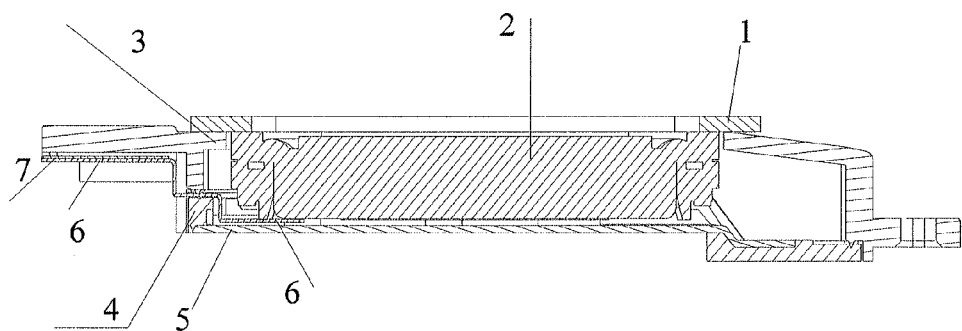
FIG. 3 shows a cross-section structural diagram of the loudspeaker box provided by the embodiment of the present disclosure.

FIG. 3 shows a cross-section structural diagram of the loudspeaker box provided by the present disclosure.

In this embodiment, the box 8 further includes a rear housing 4 and a metallic plate 5. The rear housing 4 is set on the metallic plate 5, the rear housing 4 and the metallic plate 5 are integrally formed by injection molding, and the rear housing 4 and the front housing 3 are spatially set in an up-and-down manner. In this embodiment, the rear housing 4 may be tightly assembled with the front housing 3 in an ultrasonic welding manner or a glue adhering manner.

The upper surface of the loudspeaker 2 is basically aligned to the upper surface of the front housing 3, a gap is set between the loudspeaker 2 and the front housing 3, and the foam 1 is covered on the gap between the loudspeaker 2 and the front housing 3.

The lower surface of the loudspeaker 2 is set on the metallic plate 5, and one end of the lower surface of the loudspeaker 2 contacts against one end of the metallic plate 5, or one end of the lower surface of the loudspeaker 2 may abut against one end of the metallic plate 5. The other end of the lower surface of the loudspeaker 2 is connected to one end of the circuit board 6.

To impel the loudspeaker 2 to transmit the signal outside the loudspeaker box, the loudspeaker box further includes a circuit board 6, one end of the circuit board 6 is set between the metallic plate 5 and the loudspeaker 2, and the other end of the circuit board 6 runs through one end of the rear housing 4 and is set on the surface of the front housing 3. In this embodiment, the other end of the circuit board 6 may be set on the lower surface of the front housing 3.

Certainly, in this embodiment, optionally, one end of the circuit board 6 is set between the metallic plate 5 and the loudspeaker 2, and the other end of the circuit board is set on the surface of the rear housing 4.

In this embodiment, the lower surface of one of the ends of the circuit board 6 adheres to the upper surface of the metallic plate 5 by a gel 7, and a positive endpoint and a negative endpoint of the upper surface of this end of the circuit board 6 are connected to the positive endpoint and the negative endpoint of the loudspeaker 2. Meanwhile, the upper surface of the other end of the circuit board 6 adheres to the lower surface of the front housing 3 by the gel 7.

Optionally, in this embodiment, the lower surface of one of the ends of the circuit board 6 adheres to the upper surface of the metallic plate 5 by the gel 7, and the positive endpoint and the negative endpoint of the upper surface of this end of the circuit board 6 are connected to the positive endpoint and the negative endpoint of the loudspeaker 2, meanwhile, the other end of the circuit board 6 adheres to the surface of the rear housing 4 by the gel 7.

In this embodiment, the gel 7 may be a double-sided tape. The circuit board 6 may be a thin flexible circuit board, or may be a cable. The metallic plate 5 may be a very thin metallic plate.

In this embodiment, because the opening surface of the loudspeaker 2 is basically aligned to the edge of the opening of the front housing 3, the foam 1 is covered on the gap between the loudspeaker 2 and the front housing 3, the lower surface of the loudspeaker 2 is set on the metallic plate 5, and one end of the lower surface of the loudspeaker 2 contacts against one end of the metallic plate 5 while the rear housing 4 is set on the metallic plate 5, and the rear housing 4 and the metallic plate 5 are integrally formed by injection molding, so that the thickness of the loudspeaker box is formed of the thickness of the metallic plate, the thickness of the loudspeaker and the thickness of the foam.

Figure 4:
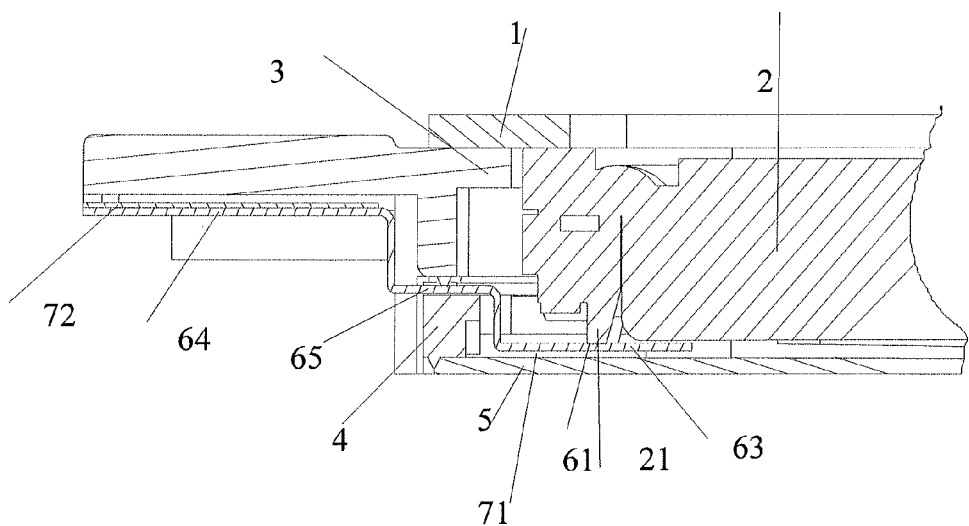
FIG. 4 shows a partial enlarged diagram of a cross-section structure of the loudspeaker box provided by the embodiment of the present disclosure.
Figure 5:
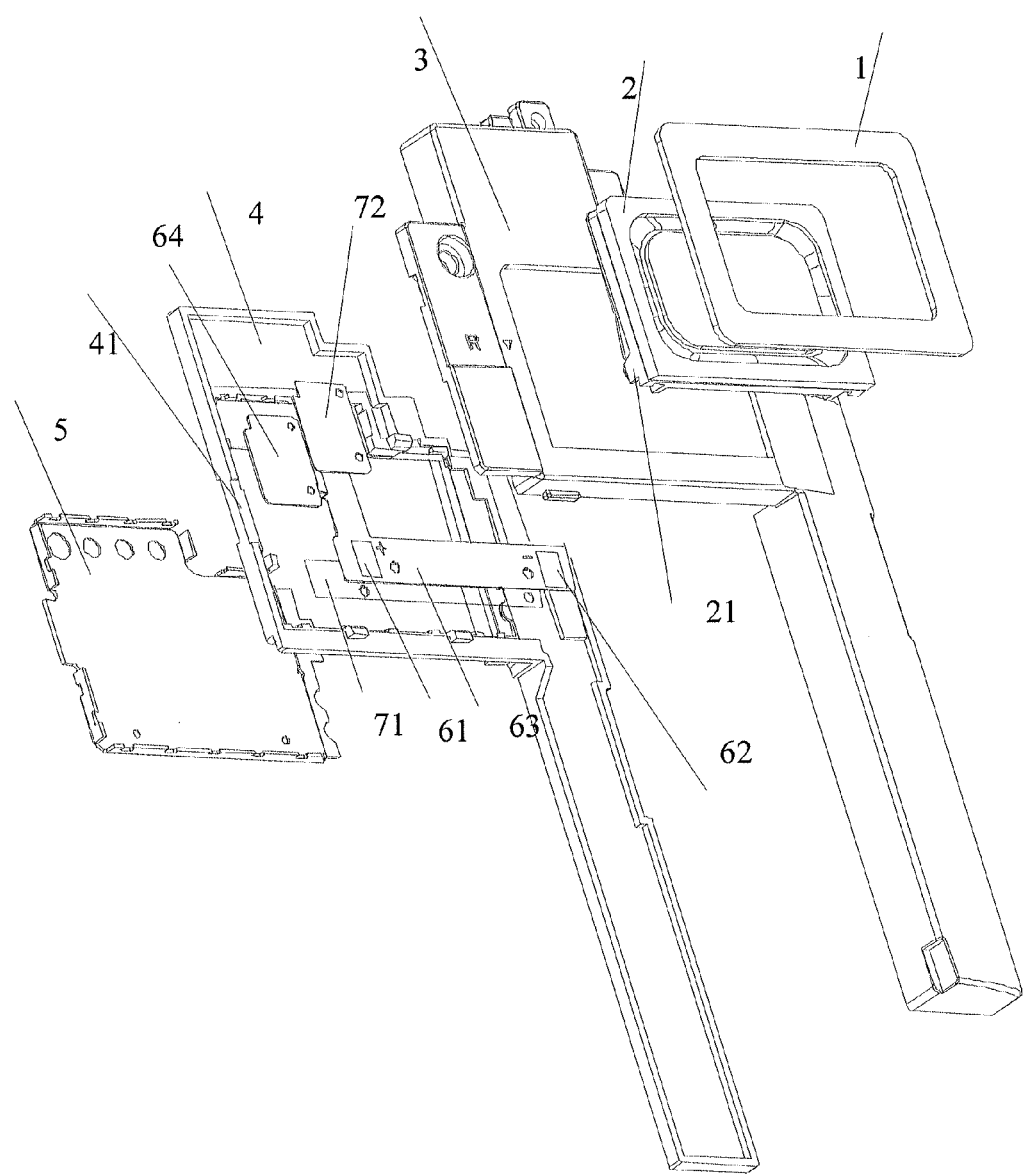
FIG. 5 shows an exploded structural diagram of the loudspeaker box provided by the embodiment of the present disclosure.

FIG. 4 shows a partial enlarged diagram of a cross-section structure of the loudspeaker box provided by the present disclosureing this embodiment, the gel 7 includes a first gel 71 and a second gel 72, a circuit board 6 includes a positive endpoint 61, an internal section circuit board 63, an external section circuit board 64 and a middle section circuit board 65, and the circuit board 6 further includes a negative endpoint 62 (as shown in FIG. 5). The loudspeaker 2 includes a positive endpoint 21 and a negative endpoint (not shown, and corresponding to the negative point 62).

In this embodiment, the lower surface of the internal section circuit board 63 adheres to the upper surface of the metallic plate 5 by the first gel 71, and the positive endpoint 61 of the upper surface of the internal section circuit board 63 is connected to the positive endpoint 21 of the loudspeaker 2, and certainly, the negative endpoint 62 of the internal section circuit board 63 is connected to the negative endpoint of the loudspeaker 2. The upper surface of the external section circuit board 64 adheres to the lower surface of a front housing 3 by the second gel 72. The middle section circuit board 64 runs through one end of the rear housing 4.

Optionally, in this embodiment, the external section circuit board 64 may further adhere to the surface of the rear housing 4 by the gel. No limitation is provided in this embodiment.

FIG. 5 shows an exploded structural diagram of the loudspeaker box provided by the present disclosure.

In this embodiment, the rear housing 4 includes a slot 41, and the circuit board 6 runs through the slot 41 of the rear housing 4. With reference to FIG. 4 and FIG. 5, it may be known that the middle section circuit board 65 of the circuit board 6 runs through one end of the rear housing 4.

In this embodiment, the circuit board 6 further includes a positive endpoint 61 and a negative endpoint 62, corresponding to the positive endpoint 21 and the negative endpoint (not shown) of a loudspeaker 2 respectively. The internal section circuit board 63 is corresponding to the first gel 71 in position, and the external section circuit board 64 is corresponding to the second gel 72 in position. The rear housing 4 is set on the metallic plate 5. In this embodiment, the rear housing 4 and the metallic plate 5 are integrally formed by injection molding, or, the rear housing 4 and the metallic plate 5 may adhere to each other by the double-sided tape. In this embodiment, the metallic plate 5 may be melted to the rear housing 4 by heating to realize the integral injection molding of the rear housing 4 and the metallic plate 5.

The front housing 3 is corresponding to the rear housing 4 in position, an opening is set on the front housing 3, the loudspeaker 2 is corresponding to the shape of the opening, and the loudspeaker 2 is placed inside the box 2, which is formed of the front housing 3 and the rear housing 4, through the opening.

The foam 1 is covered on the upper surfaces of the front housing 3 and the loudspeaker 2, and the shape of the foam 1 is corresponding to the shape of the opening of the front housing 3 and the shape of the loudspeaker 2.

In this embodiment, the loudspeaker box may also be assembled in an electronic product or a mobile terminal device, such as a tablet computer, an eBook, a navigator, a digital photo frame, and a notebook computer. In this embodiment, the mobile terminal device includes a PCB (Printed-CircuitBoard, printed circuit board), and a loudspeaker box. The loudspeaker box is set on the PCB, and the PCB may also be provided with a processor, a radio frequency circuit, a SIM socket, earphones, a memory, a chip, and so on. The mobile terminal device may further include a screen and a housing.

For the loudspeaker box provided by the embodiment, because the thickness of the loudspeaker box is formed of the thickness of the metallic plate, the thickness of the loudspeaker and the thickness of the foam, the influence of the wall thicknesses of the front housing and the rear housing of the box to the thickness of the loudspeaker box is reduced, and the integral thickness of the loudspeaker box is reduced in comparison with the prior art; and when the loudspeaker box is assembled in the electronic product or the mobile terminal device, the influence of the loudspeaker box to the thickness of the complete appliance of the electronic product or the mobile terminal device is reduced, so that the thickness of the complete appliance of the electronic product or the mobile terminal device may be reduced, and therefore, the complete appliance of the electronic product or the mobile terminal device may be very thin.

At last, it should be noted that the above embodiments have been used for illustration of solutions of the present disclosure, but not for limitation, although the present disclosure has been illustrated in detail in reference with exemplary embodiments, persons skilled in the art should understand that modifications or equivalent replacements may be made to the solutions of the present disclosure, and those modifications or equivalent replacements also cannot cause modified solutions to depart from the spirit and scope of the solutions of the present disclosure.

What is claimed is:

1. A loudspeaker box, comprising:
   a foam, a loudspeaker, and a box having an opening of the box;
   wherein the opening of the box is set in the box, the loudspeaker is internally placed inside the box through the opening of the box, an outer surface of the loudspeaker is aligned to an edge of the opening of the box, a gap is set between the loudspeaker and the opening of the box, and a bottom portion of the loudspeaker abuts against a bottom portion of the box;
   wherein the foam is annularly covered on the gap between the loudspeaker and the opening of the box;
   wherein the box further comprises a rear housing and a metallic plate, the rear housing is set on the metallic plate, and the rear housing and the metallic plate are integrally formed by injection molding or adhere to each other by a double-sided tape;
   wherein the box further comprises a circuit board, one end of the circuit board is set between the metallic plate and the loudspeaker, the end of the circuit board is connected to the loudspeaker, and the other end of the circuit board runs through one end of the rear housing and is set on a surface of a front housing; and
   wherein the circuit board comprises a positive endpoint and a negative endpoint, the loudspeaker comprises a positive endpoint and a negative endpoint, and the positive endpoint and the negative endpoint of one end of the circuit board are correspondingly connected to the positive endpoint and the negative endpoint of the loudspeaker.

2. The loudspeaker box according to claim 1, wherein the front housing having an opening of the front housing, the loudspeaker is internally placed inside the box through the opening of the front housing, and the outer surface of the loudspeaker is aligned to the edge of the opening of the front housing.

3. The loudspeaker box according to claim 1, wherein the bottom portion of the loudspeaker abuts against the metallic plate of the box.

4. The loudspeaker box according to claim 1, wherein one end of the circuit board adheres to an upper surface of the metallic plate, and the other end of the circuit board adheres to the surface of the front housing after running through one end of the rear housing.

5. The loudspeaker box according to claim 1, wherein the circuit board comprises one of a thin flexible circuit board and a cable.

6. The loudspeaker box according to claim 1, wherein the rear housing comprises a slot, and the other end of the circuit board runs through the slot of the rear housing and is set on the surface of the front housing.

7. A loudspeaker box, comprising:
   a foam, a loudspeaker, and a box having an opening of the box;
   wherein the opening of the box is set in the box, the loudspeaker is internally placed inside the box through the opening of the box, an outer surface of the loudspeaker is aligned to an edge of the opening of the box, a gap is set between the loudspeaker and the opening of the box, and a bottom portion of the loudspeaker abuts against a bottom portion of the box; and
   wherein the foam is annularly covered on the gap between the loudspeaker and the opening of the box;
   wherein the box further comprises a rear housing and a metallic plate, the rear housing is set on the metallic plate, and the rear housing and the metallic plate are integrally formed by injection molding or adhere to each other by a double-sided tape;
   wherein the box further comprises a circuit board, one end of the circuit board is set between the metallic plate and the loudspeaker, the end of the circuit board is connected to the loudspeaker, and the other end of the circuit board is set on a surface of the rear housing;
   wherein the circuit board comprises a positive endpoint and a negative endpoint, the loudspeaker comprises a positive endpoint and a negative endpoint, and the positive endpoint and the negative endpoint of one end of the circuit board are correspondingly connected to the positive endpoint and the negative endpoint of the loudspeaker.

8. The loudspeaker box according to claim 7, wherein one end of the circuit board adheres to the upper surface of the metallic plate by a gel, and the other end of the circuit board adheres to the surface of the rear housing by the gel.

9. The loudspeaker box according to claim 7, wherein the circuit board comprises one of a thin flexible circuit board and a cable.

10. A mobile terminal device, comprising: a loudspeaker box, and a PCB circuit board, wherein the loudspeaker box is set on the PCB circuit board; and the loudspeaker box comprising:
a foam, a loudspeaker, and a box having an opening of the box;
wherein the opening of the box is set in the box, the loudspeaker is internally placed inside the box through the opening of the box, an outer surface of the loudspeaker is aligned to an edge of the opening of the box, a gap is set between the loudspeaker and the opening of the box, and a bottom portion of the loudspeaker abuts against a bottom portion of the box; and
the foam is annularly covered on the gap between the loudspeaker and the opening of the box;
wherein the box further comprises a rear housing and a metallic plate, the rear housing is set on the metallic plate, and the rear housing and the metallic plate are integrally formed by injection molding or adhere to each other by a double-sided tape;
wherein the box further comprises a circuit board, one end of the circuit board is set between the metallic plate and the loudspeaker, the end of the circuit board is connected to the loudspeaker, and the other end of the circuit board runs through one end of the rear housing and is set on a surface of the front housing;
wherein the circuit board comprises a positive endpoint and a negative endpoint, the loudspeaker comprises a positive endpoint and a negative endpoint, and the positive endpoint and the negative endpoint of one end of the circuit board are correspondingly connected to the positive endpoint and the negative endpoint of the loudspeaker.

11. The mobile terminal device according to claim 10, wherein the front housing having an opening of the front housing, the loudspeaker is internally placed inside the box through the opening of the front housing, and the outer surface of the loudspeaker is aligned to the edge of the opening of the front housing.

12. The mobile terminal device according to claim 10, wherein the bottom portion of the loudspeaker abuts against the metallic plate of the box.

13. The mobile terminal device according to claim 10, wherein one end of the circuit board adheres to an upper surface of the metallic plate, and the other end of the circuit board adheres to the surface of the front housing after running through one end of the rear housing.

14. The mobile terminal device according to claim 10, wherein the rear housing comprises a slot, and the other end of the circuit board runs through the slot of the rear housing and is set on the surface of the front housing.

15. A mobile terminal device, comprising: a loudspeaker box, and a PCB circuit board, wherein the loudspeaker box is set on the PCB circuit board; and the loudspeaker box comprising:
a foam, a loudspeaker, and a box having an opening of the box;
wherein the opening of the box is set in the box, the loudspeaker is internally placed inside the box through the opening of the box, an outer surface of the loudspeaker is aligned to an edge of the opening of the box, a gap is set between the loudspeaker and the opening of the box, and a bottom portion of the loudspeaker abuts against a bottom portion of the box; and
the foam is annularly covered on the gap between the loudspeaker and the opening of the box;
wherein the box further comprises a rear housing and a metallic plate, the rear housing is set on the metallic plate, and the rear housing and the metallic plate are integrally formed by injection molding or adhere to each other by a double-sided tape;
wherein the box further comprises a circuit board, one end of the circuit board is set between the metallic plate and the loudspeaker, the end of the circuit board is connected to the loudspeaker, and the other end of the circuit board is set on a surface of the rear housing;
wherein the circuit board comprises a positive endpoint and a negative endpoint, the loudspeaker comprises a positive endpoint and a negative endpoint, and the positive endpoint and the negative endpoint of one end of the circuit board are correspondingly connected to the positive endpoint and the negative endpoint of the loudspeaker.

16. The loudspeaker box according to claim 15, wherein one end of the circuit board adheres to the upper surface of the metallic plate by a gel, and the other end of the circuit board adheres to the surface of the rear housing by the gel.

17. The loudspeaker box according to claim 1, wherein the circuit board comprises: an internal section circuit board, an external section circuit board, and a middle section circuit board disposed between the internal section circuit board and the external section circuit board.

18. The mobile terminal device according to claim 15, wherein the circuit board comprises: an internal section circuit board, an external section circuit board, and a middle section circuit board disposed between the internal section circuit board and the external section circuit board.

* * * * *